J. E. OSMER.
DRIVE WHEEL.
APPLICATION FILED AUG. 30, 1909.
944,496.
Patented Dec. 28, 1909.
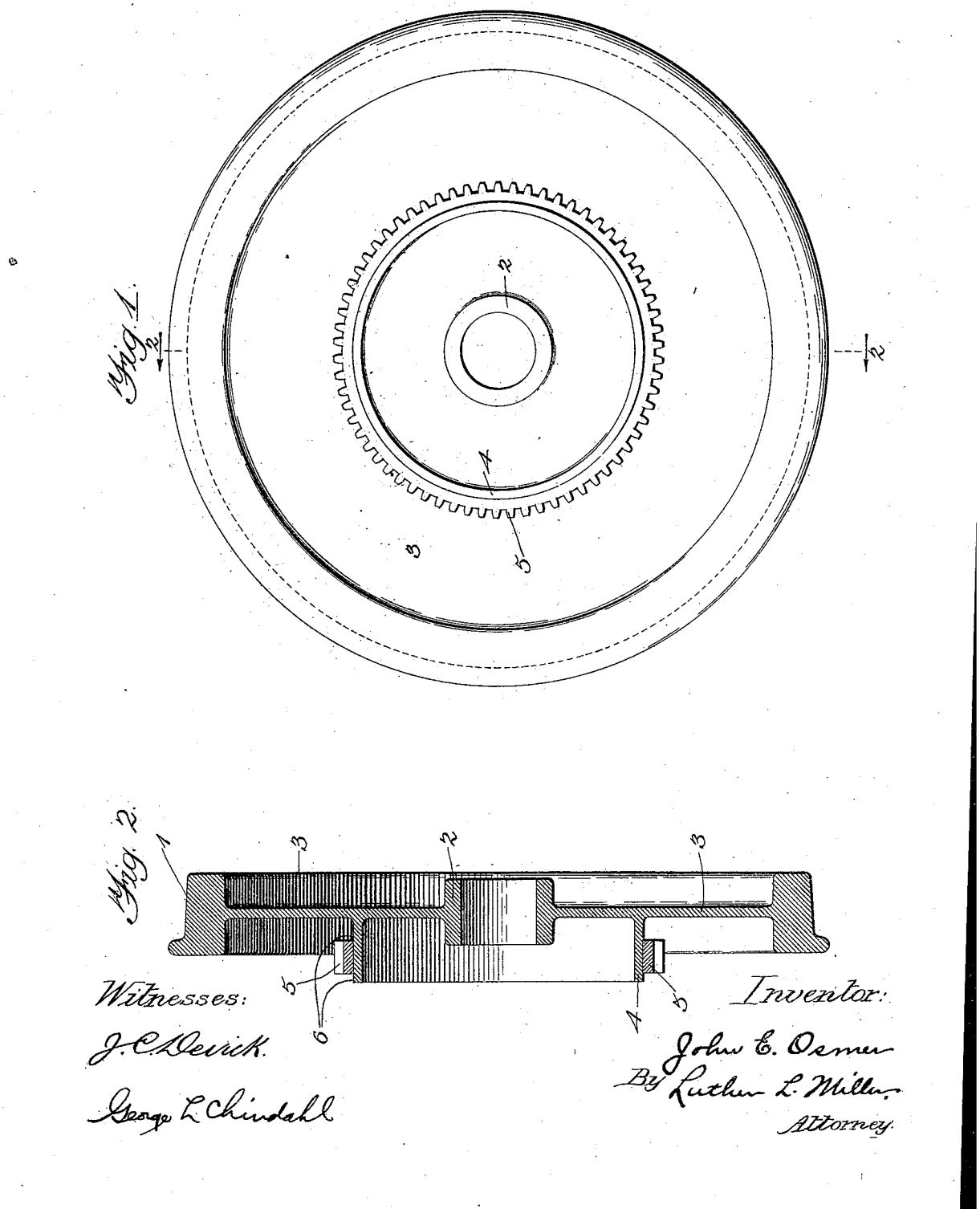

UNITED STATES PATENT OFFICE.

JOHN E. OSMER, OF CHICAGO, ILLINOIS.

DRIVE-WHEEL.

944,496.      Specification of Letters Patent.      Patented Dec. 28, 1909.

Application filed August 30, 1909. Serial No. 515,200.

*To all whom it may concern:*

Be it known that I, JOHN E. OSMER, a citizen of the United States, residing at Chicago, in the county of Cook and State of Illinois, have invented certain new and useful Improvements in Drive - Wheels, of which the following is a specification.

This invention relates to the wheels of electric railway cars and other vehicles. I have herein illustrated the invention as applied to the wheels of the motor trucks of electric railway cars. In such trucks, the motor is supported upon the axle, the pinion upon the armature shaft meshing with a spur gear which is ordinarily mounted upon the axle adjacent to the car wheel. By reason of the space thus occupied by the gear, the supports for the motor are necessarily placed nearer the center of the axle than is desirable, thereby causing a greater stress upon the axle than would result if a wider bearing for the motor were possible.

It is one of the objects of the invention to so arrange the gear that the supports for the motor may be placed at points upon the axle close to the wheels, thereby obtaining a wider or greater bearing surface for the motor structure.

Another object of the invention is to provide improved means for transmitting the torque of the motor to the car wheel so as to prevent placing twisting stresses upon the axle.

A further object is to lessen the cost of manufacture, by dispensing with extension hubs for the gear or the car wheel.

In the accompanying drawings, Figure 1 is a side elevation of a combination car wheel and drive gear embodying the features of my invention. Fig. 2 is a sectional view taken in the plane of dotted line 2 2 in Fig. 1.

The embodiment herein shown comprises a car wheel having a flanged tread 1, a hub 2 of the size commonly employed for standard car wheels, and a web 3. It will be understood that the wheel may be provided with spokes in lieu of the web 3, if desired. Integral with the web or spokes is an annular flange or rim 4 formed concentric with the hub 2. Upon the periphery of said flange is a rigidly mounted gear ring 5. In this instance the gear ring is mounted upon the outer periphery of the flange 4. Said gear ring may be integral (*i. e.* non-sectional), as herein shown, and may be secured in place by shrinking or pressing it upon the flange 4, the latter preferably being machined. Said flange 4 is of sufficient width to support the gear ring 5 and preferably to provide an annular space 6 at each side of the gear ring to receive a pan or gear casing (not shown) inclosing the gear ring and the driving pinion and closely fitting said flange, suitable packing being employed to prevent leakage of oil between the flange 4 and the gear pan. As shown in Fig. 2, the flange 4 and the gear ring 5 extend but a short distance from the inner side of the car wheel, and the hub is of the ordinary length, hence the supports for the motor may be placed close to the car wheel, thus obtaining a wide bearing for the motor and obviating the serious stress placed upon the axle when the gear is mounted upon the axle, or extension hubs are used.

It will be seen that the power is transmitted directly from the motor to the car wheel, the gear ring 5 virtually forming a part of the wheel. I thereby eliminate the liability of breaking the axle or twisting the wheel upon the axle, due to the common method of applying the torque of the motor to the axle.

When it is desirable to remove the gear ring from the flange 4, the wheel is forced off the axle and the gear ring cut or expanded and slipped off the flange.

An advantage of my construction over the axle-mounted gear wheel is that, in the latter, when the securing devices become defective, the gear wheel generally must be discarded, whereas I dispense with fastenings and obtain the maximum length of service of the gear element.

I claim as my invention:

1. A car wheel provided with an annular flange of less diameter than the wheel and formed integral with said wheel, and a separately formed gear ring secured upon the periphery of said flange.

2. A car wheel having a hub of ordinary length, and provided with an annular flange of less diameter than the wheel and formed integral with said wheel, the periphery of said flange being machined, and a gear ring shrunk upon said flange, said flange being of sufficient width to provide beside said gear ring a space for the gear pan.

3. A car wheel having a hub of ordinary length, and provided with an annular flange, and a separately formed gear ring secured upon the periphery of said flange, said flange being of sufficient width to provide beside said gear ring a space for a gear pan.

JOHN E. OSMER.

Witnesses:
C. PAUL PARKER,
GEORGE L. CHINDAHL.